United States Patent
Kang et al.

(10) Patent No.: US 12,477,628 B2
(45) Date of Patent: Nov. 18, 2025

(54) INDUCTION HEATING APPARATUS AND METHOD FOR CONTROLLING THE SAME

(71) Applicant: LG ELECTRONICS INC., Seoul (KR)

(72) Inventors: Kyelyong Kang, Seoul (KR); Ho Yong Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 920 days.

(21) Appl. No.: 17/693,687

(22) Filed: Mar. 14, 2022

(65) Prior Publication Data

US 2022/0295604 A1 Sep. 15, 2022

(30) Foreign Application Priority Data

Mar. 15, 2021 (KR) .................. 10-2021-0033615

(51) Int. Cl.
*H05B 6/06* (2006.01)
*H05B 6/36* (2006.01)
*H05B 6/44* (2006.01)

(52) U.S. Cl.
CPC .............. *H05B 6/062* (2013.01); *H05B 6/362* (2013.01); *H05B 6/44* (2013.01); *H05B 2213/07* (2013.01)

(58) Field of Classification Search
CPC .......... H05B 6/44; H05B 6/362; H05B 6/062; H05B 2213/05; H05B 2213/07
See application file for complete search history.

(56) References Cited

U.S. PATENT DOCUMENTS

| 2012/0285948 | A1 | 11/2012 | Shan et al. | |
| 2019/0268979 | A1* | 8/2019 | Kim | H05B 6/062 |
| 2019/0297680 | A1* | 9/2019 | Parachini | H05B 6/1245 |

FOREIGN PATENT DOCUMENTS

| EP | 0 405 611 A1 | | 1/1991 |
| EP | 3 291 643 A1 | | 3/2018 |
| TW | 201824946 A | * | 7/2018 |
| WO | WO 2014/090864 A1 | | 6/2014 |

OTHER PUBLICATIONS

Extended European Search Report dated Jul. 29, 2022 issued in Application 22162103.0.

* cited by examiner

*Primary Examiner* — Edward F Landrum
*Assistant Examiner* — Kuangyue Chen
(74) *Attorney, Agent, or Firm* — KED & ASSOCIATES, LLP

(57) ABSTRACT

A controller may measure resonance current of a working coil, measure driving voltage of a switching element included in an inverter circuit that supplies current to the working coil, and generates a phase margin pulse based on the resonance current and the driving voltage. The controller may compare the phase margin pulse with a switching signal and determine a driving state of the induction heating apparatus, and control driving of the working coil based on the driving state of the induction heating apparatus. Additionally, when it is determined that a driving frequency of the working coil is included in a capacitive area, the induction heating apparatus stops from operating, or a driving frequency of the working coil is set again.

17 Claims, 8 Drawing Sheets

INDUCTION HEATING APPARATUS AND METHOD FOR CONTROLLING THE SAME

CROSS-REFERENCE TO RELATED APPLICATION

This application claims priority to and the benefit of Korean Patent Application No. 10-2021-0033615, filed in Korea on Mar. 15, 2021, the subject matter of which is incorporated herein by reference.

BACKGROUND

1. Field

Disclosed herein are an induction heating apparatus and a method for controlling the same.

2. Background

Induction heating apparatuses may generate eddy current in a container made of metal by using a magnetic field generated around a working coil to heat the container. As an induction heating apparatus operates, high-frequency current is supplied to a working coil. Accordingly, an induction magnetic field is generated around the working coil disposed in the induction heating apparatus. As the magnetic line of force of the generated induction magnetic field passes through the bottom of a container (including a metallic ingredient) provided on (or over) the working coil, eddy current is generated inside the bottom of the container. As the generated eddy current flows in the container, the container itself is heated.

When a user sets a power level in the state in which a container is placed in a heating zone (or heating area) of the induction heating apparatus, and inputs an instruction to initiate heating, a required power value corresponding to the set power level is determined. When the induction heating apparatus starts to be driven according to the instruction to initiate heating, a driving frequency of the working coil (under the heating zone) is determined. The driving frequency of the working coil corresponds to the required power value. While the induction heating apparatus is operating, an output power value of the working coil is controlled to correspond to the required power value.

FIG. 1 is a graph showing a relationship between driving frequencies of a working coil and output power values of the working coil when an induction heating apparatus operates. In a frequency-output power value curve, with respect to a resonance frequency FR, the left area (i.e., an area including frequencies less than the resonance frequency FR) is referred to as a capacitive area CA. In the frequency-output power value curve, with respect to a predetermined reference frequency FL, the right area (i.e., an area including frequencies greater than the reference frequency FL) is referred to an inductive area IA. The reference frequency FL is the same as or greater than the resonance frequency FR.

When a driving frequency of the working coil is set to a frequency included in the inductive area IA at a time when the induction heating apparatus operates, the induction heating apparatus is to operate normally. However, when a driving frequency of the working coil is set to a frequency included in the capacitive area CA at a time when the induction heating apparatus operates, the induction heating apparatus is to operate abnormally.

Specifically, when the working coil operates in the capacitive area CA, the power efficiency of an inverter circuit and the working coil decreases, as the switching loss of switching elements included in the inverter circuit that supplies current to the working coil increases due to failure in zero voltage switching (ZVS) of the switching elements. Additionally, as the switching loss of the switching elements increases due to the failure in zero voltage switching, the temperature of the switching elements increases, causing the switching elements to be burned.

To enhance the power efficiency of the induction heating apparatus and prevent the switching elements from being burned or damaged, there is a need to determine whether the driving frequency of the working coil when the induction heating apparatus operates is within one of the capacitive area and the inductive area.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
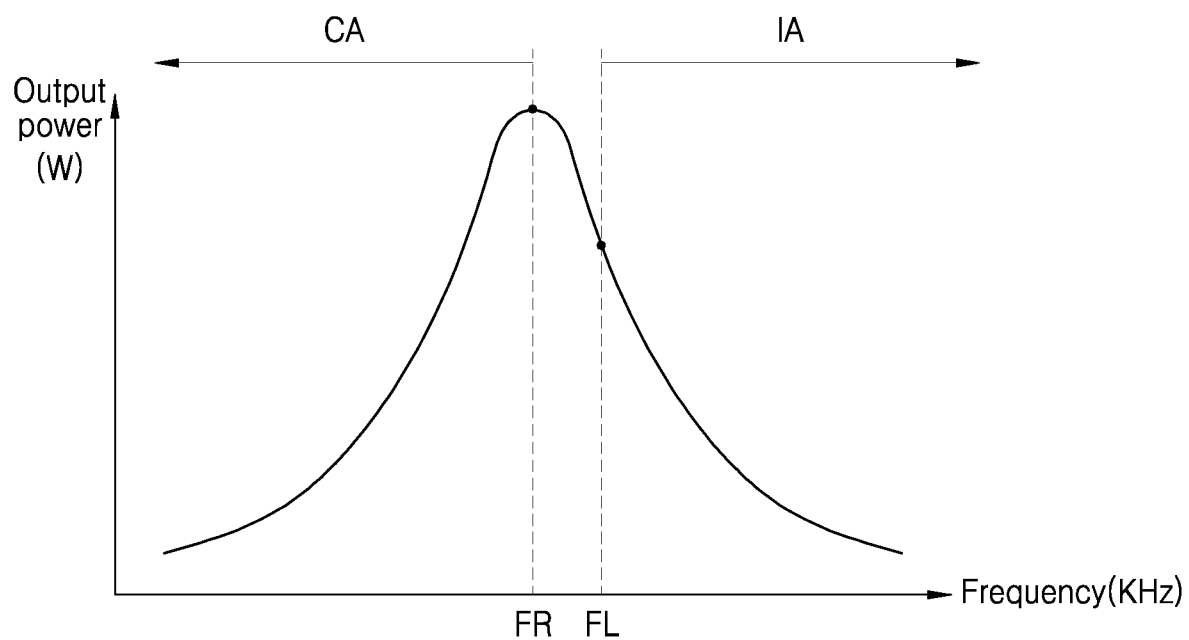
FIG. 1 is a graph showing a relationship between a driving frequency and an output power value of a working coil when an induction heating apparatus operates.

The above-described aspects, features and advantages are specifically described hereafter with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Hereafter, preferred embodiments according to the disclosure are specifically described with reference to the accompanying drawings. In the drawings, identical reference numerals can denote identical or similar components.

Figure 2:
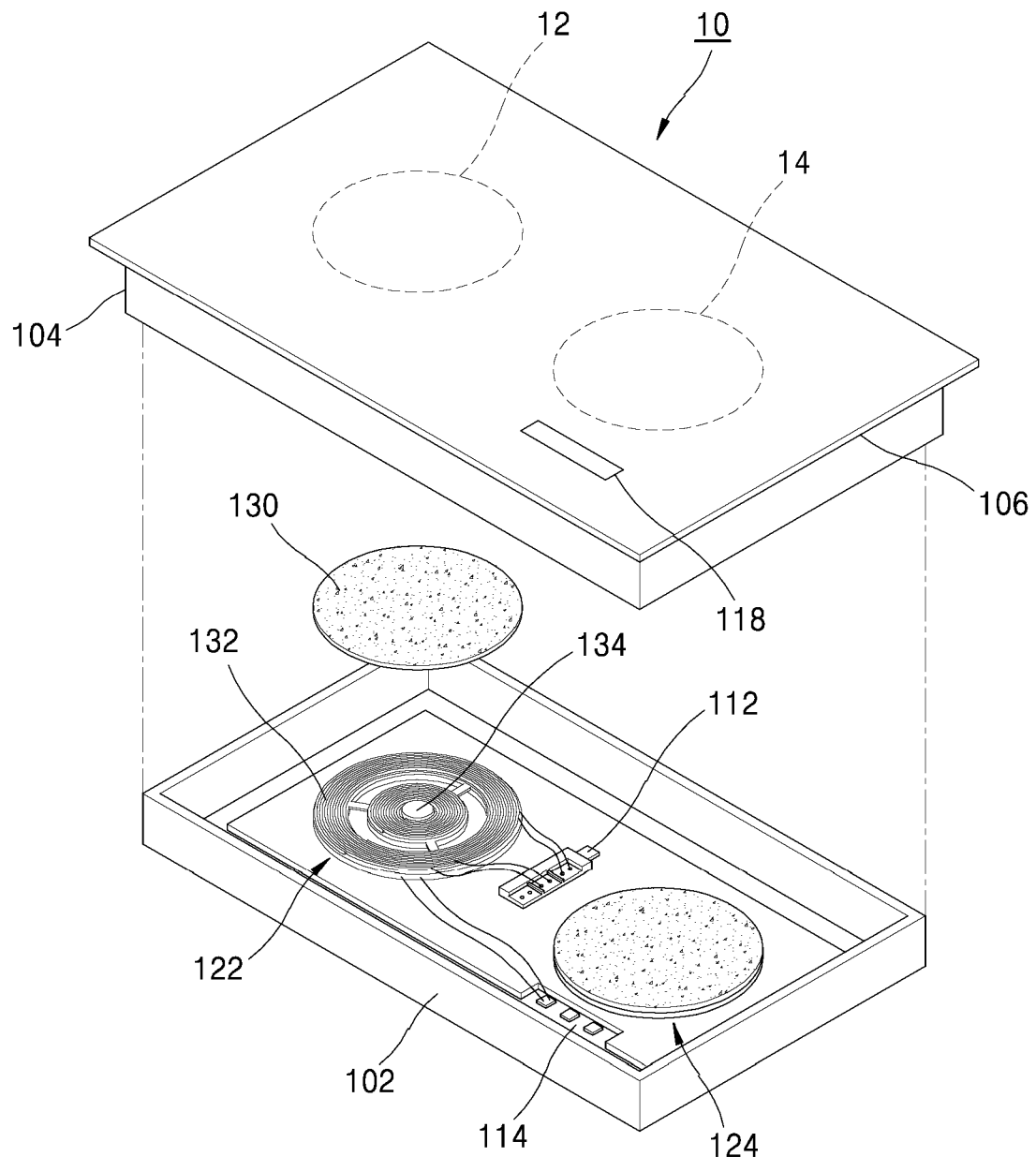
FIG. 2 is an exploded perspective view showing an induction heating apparatus of one embodiment.

FIG. 2 is an exploded perspective view showing an induction heating apparatus of one embodiment. The induction heating apparatus 10 of one embodiment includes a case 102 constituting a main body, and a cover plate 104 coupled to the case 102 and sealing the case 102.

The cover plate 104 is coupled to the upper surface of the case 102 and seals a space formed inside the case 102 from the outside. The cover plate 104 includes an upper plate 106 on which a container used for cooking a food item is to be provided. In one embodiment, the upper plate 106 may be made of tempered glass such as ceramic glass, but a material for the upper plate 106 may vary depending on embodiments.

One or more heating zones (or heating areas) 12, 14 corresponding respectively to one or more working coil assemblies 122, 124 is formed on the upper plate 106. For a user to clearly recognize the position of the one or more heating zones 12, 14, a line or a figure corresponding to the one or more heating zones 12, 14 may be printed or marked on the upper plate 106.

The case 102 may be formed as a cuboid having the upper portion open. The working coil assemblies 122, 124 for heating a container are disposed in the space formed inside the case 102. Additionally, the case 102 has an interface 114 therein that allows the user to input or start a supply power or to adjust a power level of each of the one or more heating zones 12, 14. The user interface or input unit may display information on the induction heating apparatus 10. The interface 114 may be embodied as a touch panel enabling a touch-based input of information and/or a display of information. However, the interface 114 having a different structure may be used depending on embodiments.

Further, a manipulation zone 118 may be disposed on the upper plate 106 in a position corresponding to the interface 114. For the user's manipulation, characters or images and the like may be printed in the manipulation zone 118. The user may touch a specific point of the manipulation zone 118 with reference to the characters or images that are printed in advance in the manipulation zone 118 to perform desired manipulation. Further, information output by the interface 114 may be displayed through the manipulation zone 118. The manipulation zone 118/input unit may be realized as buttons or knobs having a separate dis-play device or indication lamps.

The user may set a power level of the one or more heating zone 12, 14 through the interface 114 (or input unit). The power level may be marked in the manipulation zone 118 as numbers (e.g., 1, 2, 3, . . . , 9). When a power level of the one or more heating zone 12, 14 is set, a required power value and a driving frequency of a working coil corresponding to the one or more heating zone 12, 14 are determined. A controller drives each working coil based on the determined driving frequency such that an actual output power value of each working coil matches the required power value set by the user for the one or more working coils respectively.

A power supply unit 112 for supplying power to the one or more working coil assemblies 122, 124 or the interface 114 is disposed in the space formed inside the case 102.

The embodiment of FIG. 2 shows two working coil assemblies (i.e., a first working coil assembly 122 and a second working coil assembly 124) disposed inside the case 102, for example. However, one or three or more working coil assemblies may be disposed inside the case 102 depending on embodiments.

The working coil assembly 122, 124 may include an insulating sheet to protect a working coil from heat generated by the working coil that forms an induction magnetic field using high-frequency alternating current supplied by the power supply 112, and by a container. In FIG. 2, the first working coil assembly 122 includes a first working coil 132 for heating a container placed in (or provided on) the first heating zone 12, and a first insulating sheet 130, for example. The second working coil assembly 124 includes a second working coil and a second insulating sheet. Depending on embodiments, the insulating sheet may be excluded.

A temperature sensor is disposed in the central portion of the one or more working coils or at any other position. In FIG. 2, a temperature sensor 134 is disposed in the central portion of the first working coil 132, for example. The temperature sensor 134 measures a temperature of a container placed in the heating zone. For example, the temperature sensor 134 may be a thermistor having a variable resistance in which a resistance value changes depending on a temperature of a container, but not limited.

In one embodiment, the temperature sensor outputs sensing voltage corresponding to a temperature of a container, and the sensing voltage output from the temperature sensor is delivered to a controller. The controller determines a temperature of the container, based on magnitude of the sensing voltage output from the temperature sensor. When the temperature of the container is a predetermined reference value or greater, the controller may perform an overheat prevention operation by lowering an actual power value of the working coil or by stopping driving of the working coil.

One or more boards may be disposed in the space formed inside the case 102. A plurality of circuits or elements (including the controller) is mounted onto the one or more boards. The controller may drive the one or more working coil and perform a heating operation according to an instruction to initiate heating, input by the user through the interface 114. When the user inputs an instruction to end or stop heating through the interface 114, the controller stops the driving of the working coil and ends the heating operation.

Figure 3:
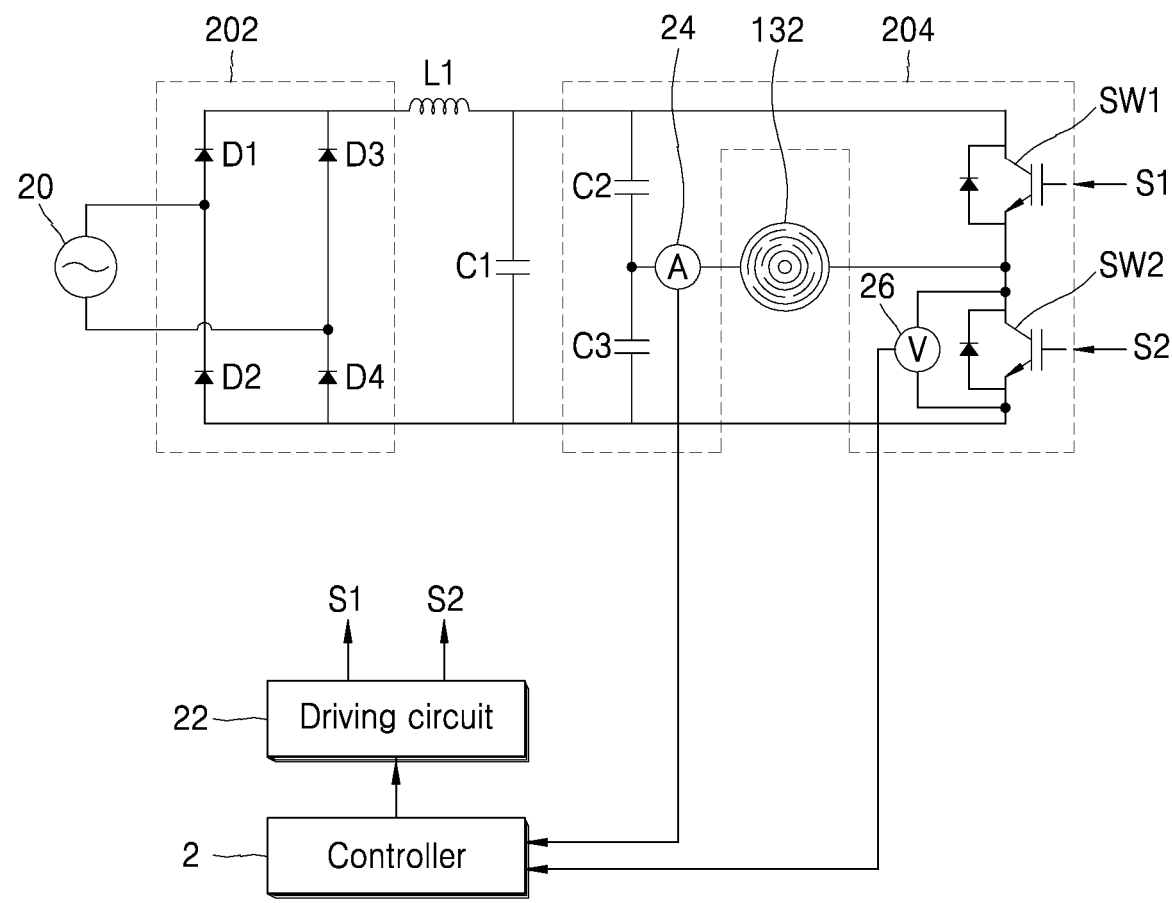
FIG. 3 is a circuit diagram showing the induction heating apparatus of one embodiment.

FIG. 3 is a circuit diagram showing the induction heating apparatus of one embodiment. The induction heating apparatus 10 of one embodiment includes a rectifying circuit 202, a smoothing circuit L1, C1, an inverter circuit 204 (or inverter) and a working coil 132.

The rectifying circuit 202 includes a plurality of diode elements D1, D2, D3, D4. The rectifying circuit 202, as illustrated in FIG. 3, may be a bridge diode circuit, and may be another type of circuit depending on embodiments. The rectifying circuit 202 rectifies AC input voltage supplied by a power supply device 20 (or power supply) and outputs voltage having pulse waveforms.

The smoothing circuit L1, C1 smooths the voltage rectified by the rectifying circuit 202 and outputs DC link voltage. The smoothing circuit L1, C1 includes a first inductor L1 and a DC link capacitor C1.

The inverter circuit (or inverter) 204 includes a first switching element SW1, a second switching element SW2, a first capacitor C2, and a second capacitor C3.

As illustrated in FIG. 3, the inverter circuit 204 of the induction heating apparatus 10 of one embodiment may be a half bridge circuit including two switching elements SW1, SW2. However, in another embodiment, the inverter circuit 204 may be a full bridge circuit including four switching elements.

The first switching element SW1 and the second switching element SW2 are turned on and turned off respectively by a first switching signal S1 and a second switching signal S2. In one embodiment, each switching element SW1, SW2 is turned off when each switching signal S1, S2 is at a high level, and is turned on when each switching signal S1, S2 is at a low level. However, in another embodiment, each switching element SW1, SW2 may be turned on when each switching signal S1, S2 is at a high level, and may be turned off when each switching signal S1, S2 is at a low level.

FIG. 3 shows that each switching element SW1, SW2 is an IGBT element, for example. However, each switching element SW1, SW2 may be another type of switching element (e.g., a BJT or an FET and the like) depending on embodiments.

The switching elements SW1, SW2 may be turned on and turned off complementarily and mutually. For example, in any operation mode, the second switching element SW2 may be turned off (turned on) while the first switching element SW1 is turned on (turned off).

Based on the turn-on and turn-off operations (i.e., switching operations) of the switching elements SW1, SW2 included in the inverter circuit 204, DC link voltage input to the inverter circuit 204 is converted into AC voltage (alternating current). The alternating current output from the inverter circuit 204 is supplied to the working coil 132. As the alternating current is supplied from the inverter circuit 204, resonance occurs in the working coil 132, and thermal energy is supplied to a container.

For example, the first switching signal S1 and the second switching signal S2 may be respectively a pulse width modulation (PWM) signal having a predetermined duty ratio.

As the alternating current output from the inverter circuit 204 is supplied to the working coil 132, the working coil 132 is to operate. As the working coil 132 operates, a container provided on (or over) the working coil1 132 is heated while eddy current flows in the container. Magnitude of heat energy supplied to the container varies depending on magnitude of power that is actually generated as the working coil 132 operates (i.e., the working coil's actual output power value).

As the induction heating apparatus 10 is turned on (powered on) based on the user's manipulation of the interface of the induction heating apparatus 10, the induction heating apparatus is on standby for driving while power is supplied from an input power supply 20 to the induction heating apparatus. Then the user gives an instruction to initiate heating to a working coil of the induction heating apparatus by placing a container over the working coil and setting a power level for the container. As the user gives the instruction to initiate heating, a power value required of the working coil 132 (i.e., a required power value) is determined based on the power level set by the user.

Having received the instruction to initiate heating provided by the user, a controller 2 determines a driving frequency corresponding to the required power value of the working coil 132, and provides a control signal corresponding to the determined driving frequency to a driving circuit 22. Accordingly, the driving circuit 22 outputs switching signals S1, S2, and as each of the switching signals S1, S2 is input to each of the switching elements SW1, SW2, the working coil 132 operates. As the working coil 132 operates, the container is heated while eddy current flows in the container.

In one embodiment, the controller 2 determines a driving frequency of the working coil 132 such that the driving frequency corresponds to a power level of a heating zone set by the user. For example, as the user sets the power level of the heating zone, the controller 2 may set the driving frequency of the working coil 132 to a maximum predetermined frequency and then gradually decrease the driving frequency of the working coil 132 until the output power value of the working coil 132 matches the required power value corresponding to the power level set by the user. The controller 2 may determine, as the driving frequency of the working coil 132, a frequency at a time when the output power value of the working coil 132 matches the required power value.

The controller 2 provides a control signal corresponding to the determined driving frequency to the driving circuit 22. The driving circuit 22 outputs switching signals S1, S2 having duty ratios corresponding to the driving frequency determined by the controller 2, based on the control signal output from the controller 2. As the switching signals S1, S2 are input, alternating current is supplied to the working coil 132 while the switching elements SW1, SW2 are turned on and turned off complementarily.

As the container is heated as a result of the driving of the working coil 132, the controller 2 may acquire magnitude of resonance current (i.e., a resonance current value) of the working coil 132, which is measured through a current sensor 24.

Additionally, the controller 2 may acquire magnitude of voltage supplied to the switching elements SW1, SW2 (i.e., a driving voltage value) as magnitude of driving voltage of the switching elements SW1, SW2, which is measured through a voltage sensor 26 when the switching elements SW1, SW2 are turned on and turned off complementarily. For example, when the switching elements SW1, SW2 are IGBT elements, driving voltage values of the switching elements SW1, SW2 may be magnitude of voltage between a second terminal (a collector terminal) and a third terminal (an emitter terminal), i.e., magnitude of collector-emitter voltage, out of a first terminal (a base terminal), a second terminal (a collector terminal) and a third terminal (an emitter terminal) included in the IGBT element.

FIG. 3 shows that the voltage sensor 26 measures driving voltage of the switching element SW2. However, driving voltage of the switching element SW1 may be measured depending on embodiments.

In one embodiment, the controller 2 may measure resonance current through the current censor 24, measure driving voltage of a switching element acquired through the voltage sensor 26, and generate (or provide) a phase margin pulse, based on the measured resonance current and driving voltage.

Additionally, in one embodiment, the controller 2 may determine a driving state of the induction heating apparatus 10 by comparing the phase margin pulse with a switching signal (e.g., S1) input to a switching element (e.g., SW1).

In one embodiment, the controller 2 may control driving of the working coil 132, based on a driving state of the induction heating apparatus 10.

Hereafter, described are examples of the controller 2's determining a driving state of the induction heating apparatus 10, and the controller 2's controlling driving of the working coil 132 based on the driving state of the induction heating apparatus 10.

Figure 4:
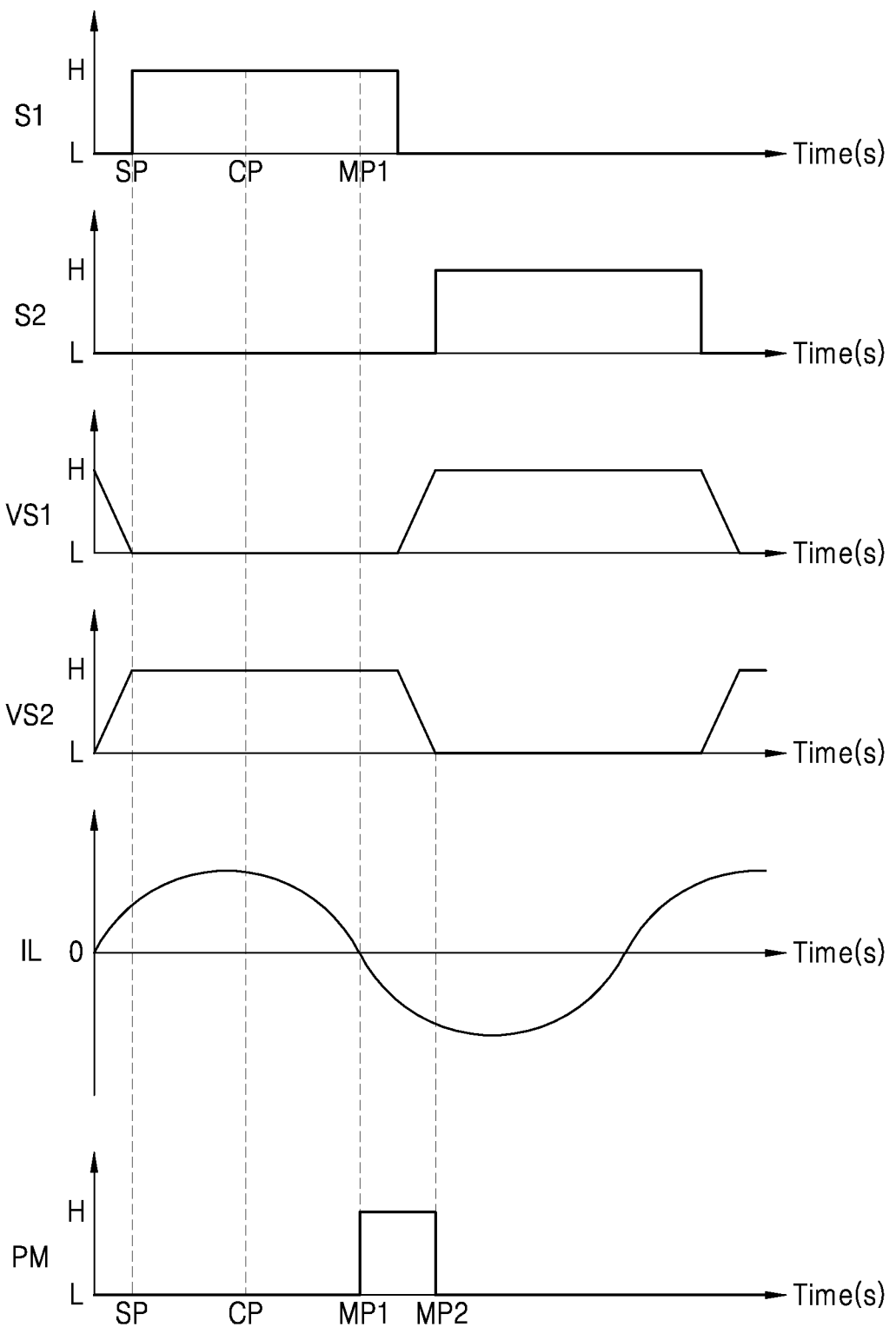
FIG. 4 is a view respectively showing waveforms of switching signals, driving voltages of switching elements, resonance current of a working coil, and a phase margin pulse, when an induction heating apparatus operates in a capacitive area.

FIG. 4 is a view respectively showing waveforms of switching signals, driving voltages of switching elements, resonance current of a working coil, and a phase margin pulse, when an induction heating apparatus operates in a capacitive area. Additionally, FIG. 5 is a view respectively showing waveforms of switching signals, driving voltages of switching elements, resonance current of a working coil, and a phase margin pulse, when an induction heating apparatus operates in an inductive area.

As the user places (or provides) a container over the working coil 132, sets a power level for the container and inputs an instruction to initiate heating, a required power value of the working coil 132, corresponding to the set power level, is determined. The controller 2 determines a driving frequency corresponding to the required power value of the working coil 132, and provides a control signal corresponding to the determined driving frequency to the driving circuit 22. Accordingly, the driving circuit 22 outputs switching signals S1, S2, and as each of the switching signals S1, S2 is input to each of the switching elements SW1, SW2, the working coil 132 operates.

Figure 5:
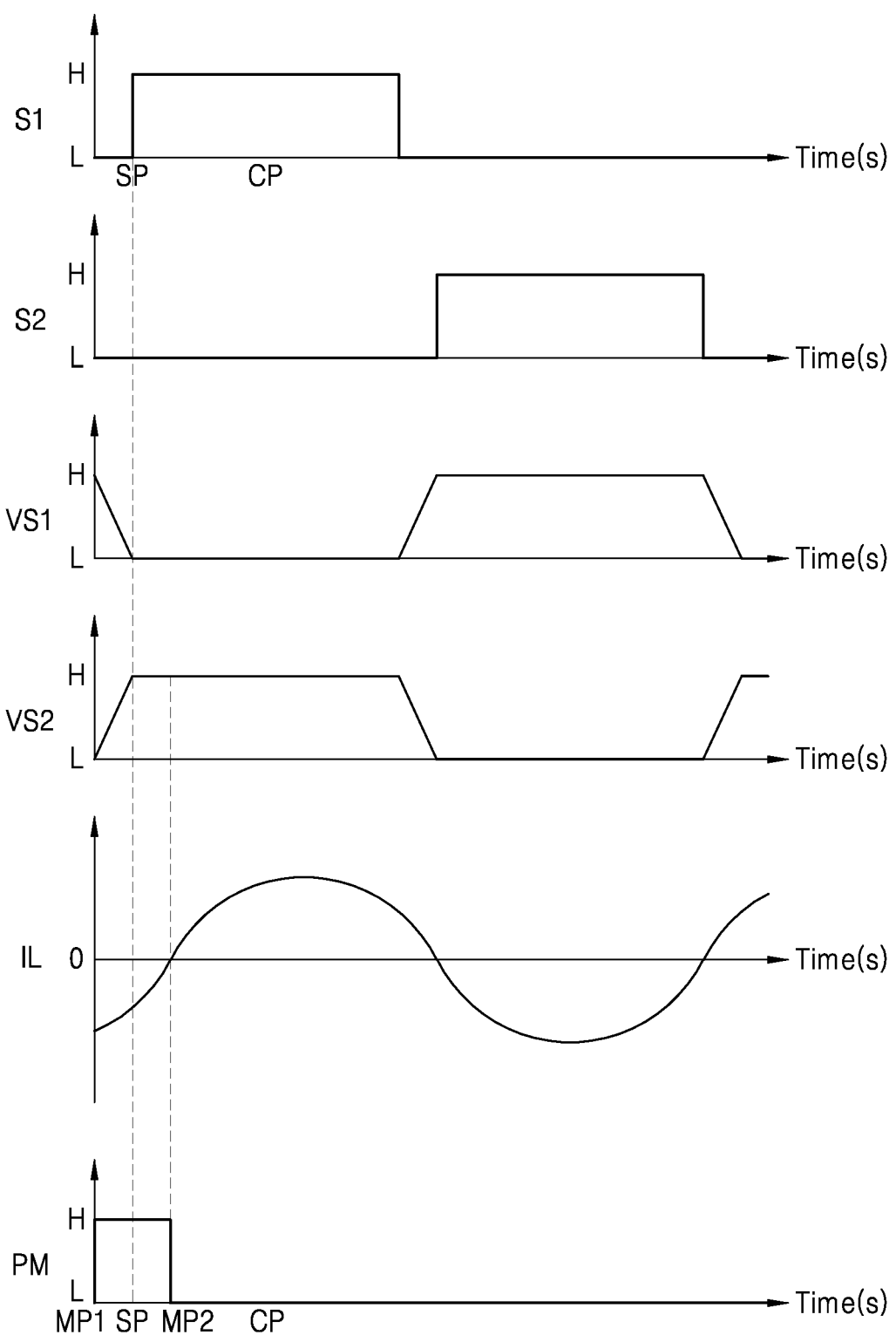
FIG. 5 is a view respectively showing waveforms of switching signals, driving voltages of switching elements, resonance current of a working coil, and a phase margin pulse, when an induction heating apparatus operates in an inductive area.

As shown in FIGS. 4 and 5, the first switching signal S1 and the second switching signal S2 are mutually complementary. That is, when the first switching signal S1 is at a high level, the second switching signal S2 is at a low level, and when the first switching signal S1 is at a low level, the second switching signal S2 is at a high level.

Further, when the first switching signal S1 and the second switching signal S2 are respectively at a high level, the driving voltage VS1 of the first switching element SW1 and the driving voltage VS2 of the second switching element SW2 are respectively at a low level, and when the first switching signal S1 and the second switching signal S2 are respectively at a low level, the driving voltage VS1 of the first switching element SW1 and the driving voltage VS2 of the second switching element SW2 are respectively at a high level. Thus, as shown in FIGS. 4 and 5, the first switching element SW1 and the second switching element SW2 are turned on and turned off complementarily and mutually.

As each of the switching signals S1, S2 is input to each of the switching elements SW1, SW2, alternating current is supplied to the working coil 132 while the switching elements SW1, SW2 are turned on and turned off complementarily and mutually. FIGS. 4 and 5 show waveforms of the resonance current IL that is measured by the current sensor 24 when the working coil 132 operates as a result of the supply of alternating current to the working coil 132.

As the working coil 132 operates, the controller 2 measures resonance current IL through the current sensor 24, and measures driving voltage VS2 of the second switching element SW2 through the voltage sensor 26. Hereafter, an example of the controller 2's generating a phase margin pulse based on the driving voltage VS2 of the second switching element SW2 is described. However, in another example, the controller 2 may generate a phase margin pulse, based on driving voltage VS1 of the first switching element SW1.

The controller 2 generates (or provides) a phase margin pulse, based on resonance current IL and the driving voltage VS2 of the second switching element SW2. In one embodiment, the controller 2 may compare the magnitude of the resonance current IL and a voltage level of the driving voltage VS2 (of the second switching element SW2), and generate (or provide) phase margin pulses PM as shown in FIGS. 4 and 5. In one embodiment, voltage levels of the phase margin pulses PM are high level in a section where the resonance current IL is a negative number and the driving voltage VS2 (of the second switching element SW2) is at a high level, and the voltage level of the phase margin pulses are low level in the remaining section(s) (or other sections).

As the phase margin pulse PM is generated (or provided), the controller 2 compares the phase margin pulse PM with the first switching signal S1, and based on results of the comparison, determines a driving state of the induction heating apparatus 10. In another embodiment, when a phase margin pulse is generated (or provided) based on the driving voltage VS1 of the first switching element SW1, the controller 2 compares the phase margin pulse PM with the second switching signal S2 to determine a driving state of the induction heating apparatus 10.

In one embodiment, the controller 2 compares a rising edge timing MP1 of the phase margin pulse PM with a center point timing CP of the first switching signal S1 in order to determine a driving state of the induction heating apparatus 10.

In the disclosure, the rising edge timing MP1 of the phase margin pulse PM denotes a timing in which a voltage level of the phase margin pulse PM changes from a low level to a high level, and a falling edge timing MP2 of the phase margin pulse PM denotes a timing in which a voltage level of the phase margin pulse PM changes from a high level to a low level.

Further, the center point timing CP of the first switching signal S1 denotes a middle time point of the first switching signal S1 in a high-level section. For example, when the rising edge timing MP1 of the phase margin pulse PM is later than the center point timing CP of the first switching signal S1, as shown in FIG. 4, the controller 2 determines that the driving state of the induction heating apparatus 10 is abnormal.

Additionally, when the rising edge timing MP1 of the phase margin pulse PM is earlier than the center point timing CP of the first switching signal S1, as shown in FIG. 5, the controller 2 determines that the driving state of the induction heating apparatus 10 is normal.

In another embodiment, the controller 2 may determine a driving state of the induction heating apparatus 10, based on a voltage level of the phase margin pulse PM, on a rising edge timing SP of the first switching signal S1.

In the disclosure, the rising edge timing SP of the first switching signal S1 denotes a timing in which a voltage level of the first switching signal S1 changes from a low level to a high level. For example, when a voltage level of the phase margin pulse PM is low level on the rising edge timing SP of the first switching signal S1, as shown in FIG. 4, the controller 2 determines that the driving state of the induction heating apparatus 10 is abnormal.

Additionally, when a voltage level of the phase margin pulse PM is high level on the rising edge timing SP of the first switching signal S1, as shown in FIG. 5, the controller 2 determines that the driving state of the induction heating apparatus 10 is normal.

In the disclosure, an abnormal driving state of the induction heating apparatus 10 means that the driving frequency of the working coil 132 is included in a capacitive area CA shown in FIG. 1. Additionally, a normal driving state of the induction heating apparatus 10 means that the driving frequency of the working coil 132 is included in an inductive area IA shown in FIG. 1.

Having determined the driving state of the induction heating apparatus 10, the controller 2 may determine whether to drive the working coil1 132, depending on the driving state of the induction heating apparatus 10. For example, when the driving state of the induction heating apparatus is determined to be normal, the controller 2 maintains operation of the working coil 132.

When the driving state of the induction heating apparatus is determined to be abnormal, the controller 2 stops operation of the working coil 132. Thus, during the driving of the induction heating apparatus, the power efficiency of the working coil 132 may improve, and the switching elements SW1, SW2 included in the inverter circuit 204 may be prevented from being burned, damaged or degraded.

In one embodiment, after the working coil 132 stops operating because the driving state of the induction heating apparatus is found abnormal, the controller 2 may calculate a driving frequency for driving the working coil 132 again at a required power value set by the user (i.e., a re-driving frequency). As the controller 2 drives the working coil 132 again at the re-driving frequency, the working coil 132 restarts heating of the container. In this case, the re-driving frequency of the working coil 132 is determined as a value greater than a resonance frequency. Thus, the induction heating apparatus may operate reliably in the inductive area IA.

Figure 6:
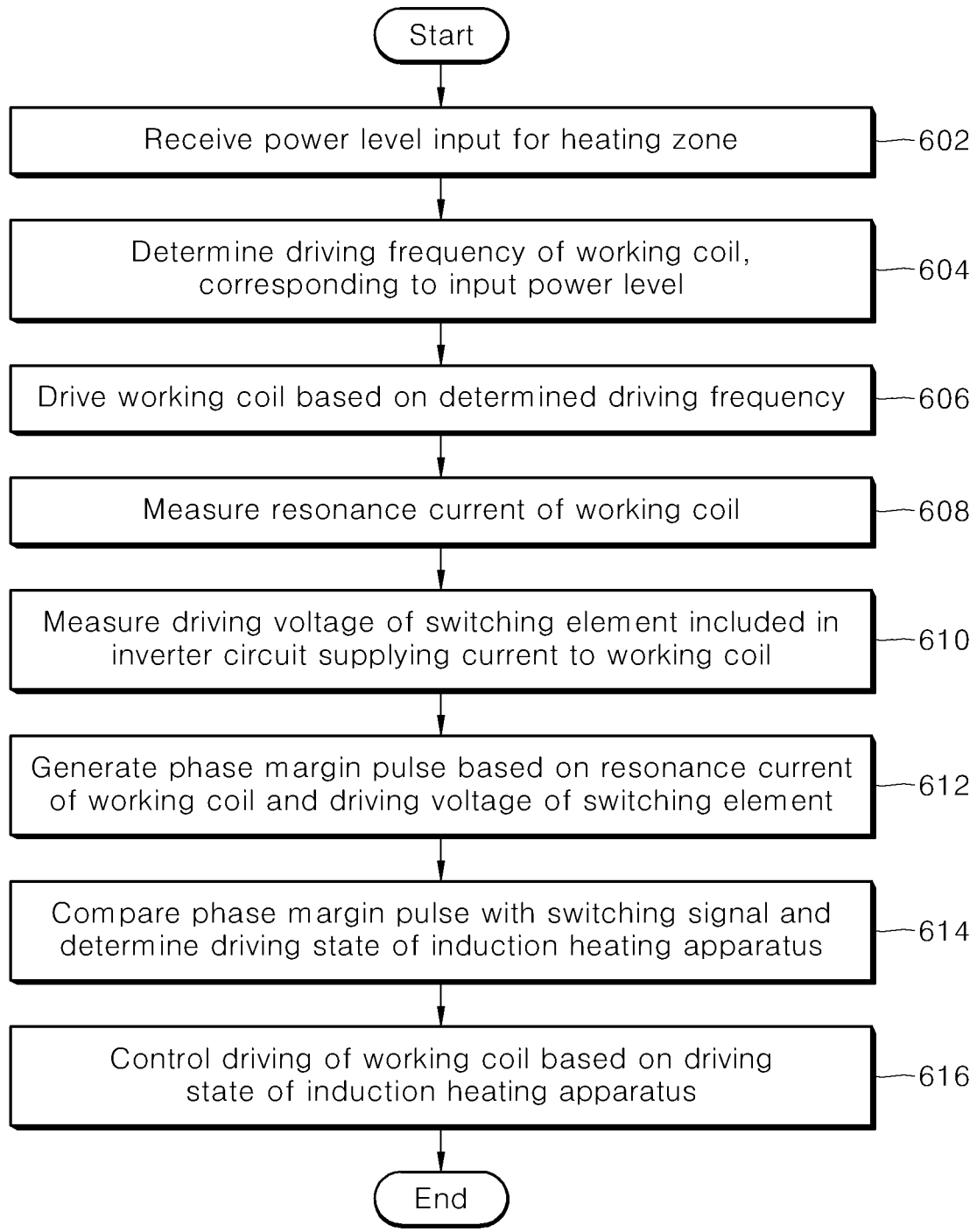
FIG. 6 is a flow chart showing a method for controlling an induction heating apparatus of one embodiment.

FIG. 6 is a flow chart showing a method for controlling an induction heating apparatus of one embodiment.

Referring to FIG. 6, the controller 2 receives a power level input for a heating zone (602). The controller 2 determines a driving frequency of the working coil 132, corresponding to the input power level (604).

As the driving frequency of the working coil 132 is determined, the controller 2 provides a control signal to the driving circuit 22, based on the determined driving frequency, and drives the working coil 132 (606).

During the driving of the working coil 132, the controller 2 measures resonance current of the working coil 132 (608). Additionally, during the driving of the working coil 132, the controller 2 measures driving voltage of a switching element (e.g., the second switching element SW2) included in the inverter circuit 204 that supplies current to the working coil 132 (610).

The controller 2 generates (or provides) a phase margin pulse, based on the resonance current of the working coil 132 measured in operation 608 and the driving voltage of the switching element (e.g., the second switching element SW2) measured in operation 610 (612). In one embodiment, a voltage level of the phase margin pulse is a high level in a section in which the resonance current is a negative number and the driving voltage of the switching element (e.g., the second switching element SW2) is a high level, and the voltage level of the phase margin pulse is a low level in the remaining section(s).

The controller 2 compares the phase margin pulse with a switching signal (e.g., S1) and determines a driving state of the induction heating apparatus 10 (614).

In one embodiment, operation 614 of determining a driving state of the induction heating apparatus 10 includes comparing a rising edge timing of the phase margin pulse with a center point timing of the switching signal (e.g., the first switching signal S1) and determining a driving state of the induction heating apparatus 10 based on the comparison.

In one embodiment, operation 614 of determining a driving state of the induction heating apparatus 10 includes determining that the driving state of the induction heating apparatus 10 is normal when the rising edge timing of the phase margin pulse is earlier than the center point timing of the switching signal (e.g., the first switching signal S1) and determining that the driving state of the induction heating apparatus 10 is abnormal when the rising edge timing of the phase margin pulse is later than the center point timing of the switching signal (e.g., the first switching signal S1).

In another embodiment, operation 614 of determining a driving state of the induction heating apparatus 10 includes determining a driving state of the induction heating apparatus 10, based on a voltage level of the phase margin pulse, on a rising edge timing of the switching signal (e.g., the first switching signal S1).

In another embodiment, operation 614 of determining a driving state of the induction heating apparatus 10 includes determining that the driving state of the induction heating apparatus 10 is normal when the voltage level of the phase margin pulse is a high level on the rising edge timing of the switching signal (e.g., the first switching signal S1), and includes determining that the driving state of the induction heating apparatus 10 is abnormal when the voltage level of the phase margin pulse is a low level on the rising edge timing of the switching signal (e.g., the first switching signal S1).

The controller 2 controls the driving of the working coil, based on the driving state of the induction heating apparatus 10 (616). In one embodiment, having determined that the driving state of the induction heating apparatus is normal, the controller 2 maintains operation of the working coil 132. However, having determined that the driving state of the induction heating apparatus is abnormal, the controller 2 stops operation of the working coil 132.

The method for controlling an induction heating apparatus of one embodiment may further include determining a re-driving frequency of the working coil 132, which corresponds to a power level after the working coil 132 stops operating, and driving the working coil 132 at the re-driving frequency.

Figure 7:
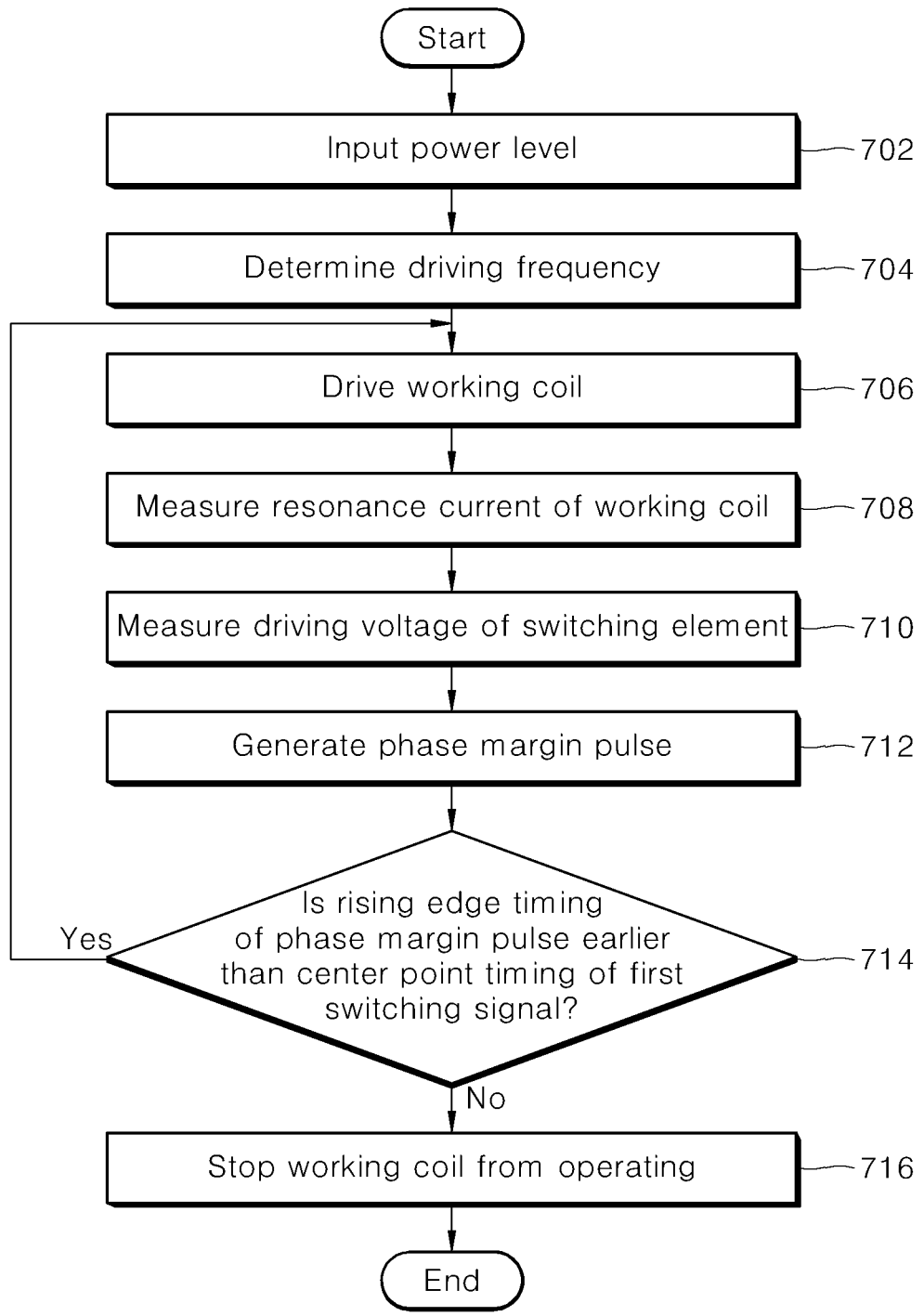
FIG. 7 is a flow chart showing a method for controlling an induction heating apparatus of another embodiment.

FIG. 7 is a flow chart showing a method for controlling an induction heating apparatus of another embodiment.

As a power level is input in a state in which the user places (or provides) a container in a heating zone (702), the controller 2 determines a driving frequency of a working coil 132, corresponding to the power level (704).

As the driving frequency is determined, the controller 2 provides a control signal corresponding to the driving frequency to the driving circuit 22. Accordingly, the working coil 132 operates at the driving frequency (706).

As the working coil 132 operates at the driving frequency, the controller 2 measures resonance current of the working coil 132 through the current sensor 24 (708). Additionally, when the working coil 132 operates, the controller 2 measures driving voltage of the second switching element SW2 through the voltage sensor 26 (710).

The controller 2 generates a phase margin pulse PM, based on the resonance current of the working coil 132 and the driving voltage of the second switching element SW2 (712).

The controller 2 determines whether a rising edge timing MP1 of the phase margin pulse PM is earlier than a center point timing CP of the first switching signal S1 (714).

When the rising edge timing MP1 of the phase margin pulse PM is earlier than the center point timing CP of the first switching signal S1 as a result of the determination in operation 714, the controller 2 determines that the driving state of the induction heating apparatus 10 is normal because the driving frequency of the working coil 132 is included in an inductive area IA, and again performs operation 706-operation 714.

When the rising edge timing MP1 of the phase margin pulse PM is later than the center point timing CP of the first switching signal S1 as a result of the determination in operation 714, the controller 2 determines that the driving state of the induction heating apparatus 10 is abnormal because the driving frequency of the working coil 132 is included in a capacitive area CA, and stops the working coil 132 from operating (716). Thus, during the driving of the induction heating apparatus, the power efficiency of the working coil 132 may improve, and the switching elements SW1, SW2 included in the inverter circuit 204 may be prevented from being burned.

The controller 2 may determine a re-driving frequency of the working coil 132, which corresponds to a required power value, after stopping the driving of the working coil 132 in operation 716, and drive the working coil 132 at the re-driving frequency. Thus, the switching elements SW1, SW2 may be prevented from being burned, and the container may be kept heating.

Figure 8:
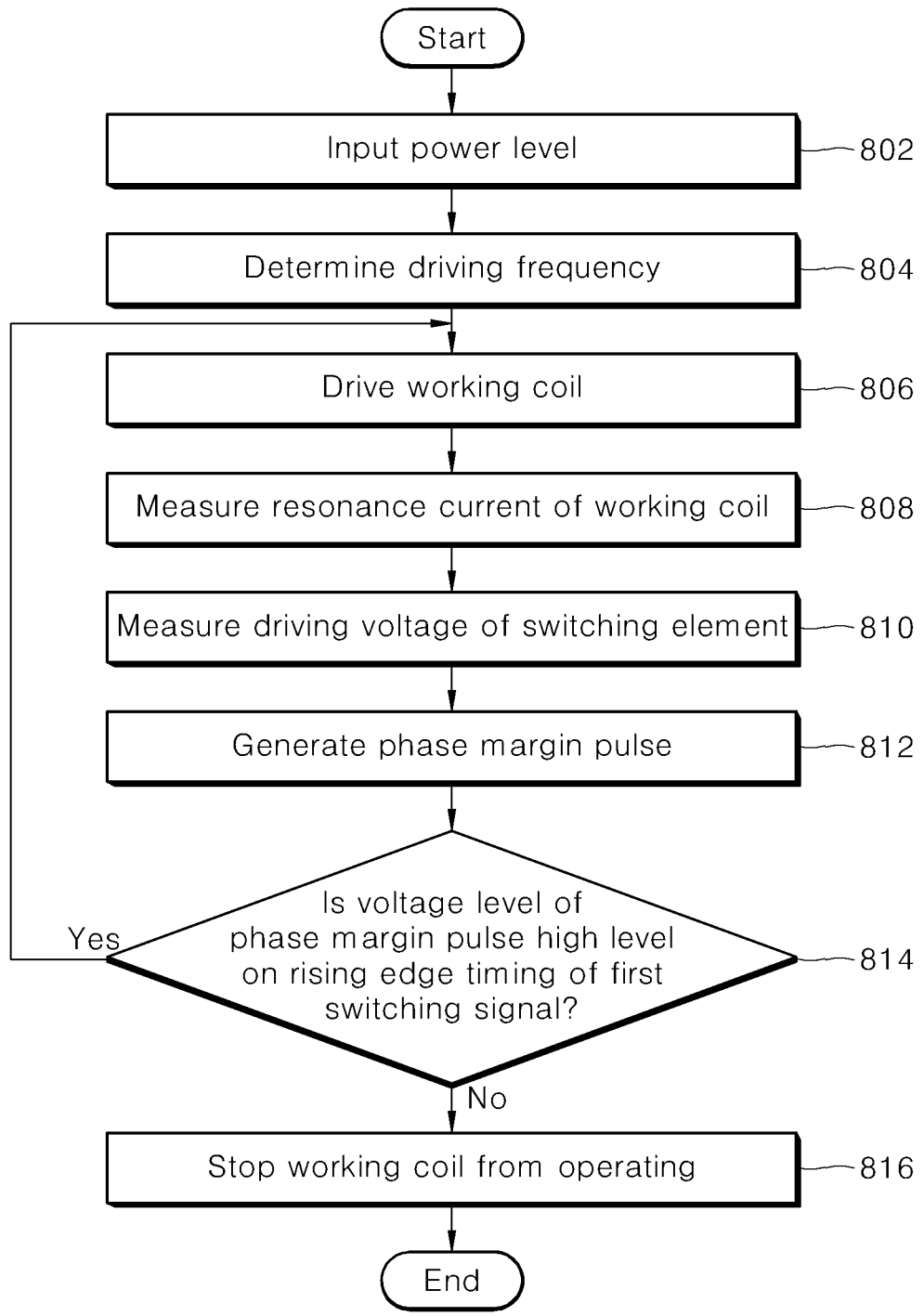
FIG. 8 is a flow chart showing a method for controlling an induction heating apparatus of yet another embodiment.

FIG. 8 is a flow chart showing a method for controlling an induction heating apparatus of another embodiment.

As a power level is input in a state in which the user places (or provides) a container in a heating zone (802), the controller 2 determines a driving frequency of a working coil 132, corresponding to the power level (804).

As the driving frequency is determined, the controller 2 provides a control signal corresponding to the driving frequency to the driving circuit 22. Accordingly, the working coil 132 operates at the driving frequency (806).

As the working coil 132 operates at the driving frequency, the controller 2 measures resonance current of the working coil 132 through the current sensor 24 (808). Additionally, when the working coil 132 operates, the controller 2 measures driving voltage of the second switching element SW2 through the voltage sensor 26 (810).

The controller 2 generates (or provides) a phase margin pulse PM, based on the resonance current of the working coil 132 and the driving voltage of the second switching element SW2 (812).

The controller 2 determines whether a voltage level of the phase margin pulse PM is a high level on a rising edge timing SP of the first switching signal S1 (814).

When the voltage level of the phase margin pulse PM is a high level on the rising edge timing SP of the first switching signal S1 as a result of the determination in operation 814, the controller 2 determines that the driving state of the induction heating apparatus 10 is normal because the driving frequency of the working coil 132 is included in the inductive area IA, and again performs operation 806-operation 814.

When the voltage level of the phase margin pulse PM is a low level on the rising edge timing SP of the first switching signal S1 as a result of the determination in operation 814, the controller 2 determines that the driving state of the induction heating apparatus 10 is abnormal because the driving frequency of the working coil 132 is included in the capacitive area CA, and stops the working coil 132 from operating (816). Thus, during the driving of the induction heating apparatus, the power efficiency of the working coil 132 may improve, and the switching elements SW1, SW2 included in the inverter circuit 204 may be prevented from being burned.

The controller 2 may determine a re-driving frequency of the working coil 132, which corresponds to a required power value, after stopping the driving of the working coil 132 in operation 816, and drive the working coil 132 at the re-driving frequency. Thus, the switching elements SW1, SW2 may be prevented from being burned, and the container may be kept heating.

One objective of the present disclosure is to provide an induction heating apparatus and a method for controlling the same that accurately whether the driving frequency of a working coil is within the capacitive area or the inductive area.

Another objective of the present disclosure is to provide an induction heating apparatus and a method for controlling the same that helps to improve power efficiency and prevent switching elements from being burned, damaged or degraded.

An induction heating apparatus of one embodiment includes a working coil disposed in a position corresponding to a heating zone, an inverter circuit including a plurality of switching elements and supplying current to the working coil, a driving circuit providing a switching signal to each switching element included in the inverter circuit, and a controller determining a driving frequency of the working coil, corresponding to a power level of the heating zone, when the power level is input, providing a control signal based on the driving frequency to the driving circuit and driving the working coil.

In one embodiment, the controller measures resonance current of the working coil, measures driving voltage of the switching element included in the inverter circuit that supplies current to the working coil, generates a phase margin pulse based on the resonance current and the driving voltage, compares the phase margin pulse with the switching signal and determines a driving state of the induction heating apparatus, and controls the driving of the working coil based on the driving state of the induction heating apparatus.

So, the general idea behind the invention is to analyze the current driving values, i.e. driving voltage and the working coil related resonance current to derive a characteristic behavior based thereon. The characteristic behavior is preferably the phase margin pulse which is based on these two values. As the comparison between the driving voltage and the resonance frequency can be easily made, a reliable identifier is created or derived based on which the operation area of the induction heating apparatus can be detected.

For deriving the phase margin pulse only a current sensor and a voltage sensor are re-quired to measure these two values. The measured values of the driving voltage and the resonance frequency are processed by the controlled and based on the detection result, i.e. whether the induction heating apparatus is currently working in the inductive area or capacitive area, i.e. normal working or abnormal working, the controller might interfere and change the operation of the induction heating apparatus based on the detection whether the induction heating apparatus is working normal or abnormal. Only in case of detecting that the induction heating apparatus is operated abnormal, the controller might stop and/or change the driving frequency to adjust thus the working area of the induction heating apparatus, i.e., to change the driving frequency that the induction heating apparatus or in particular the working coil is driven in the inductive area and is working normal.

In one embodiment, a voltage level of the phase margin pulse is high level in a section in which the resonance current is a negative number and driving voltage of a second switching element is at a high level, and is low level in the remaining section.

In one embodiment, the controller compares a rising edge timing of the phase margin pulse with a center point timing of a first witching signal and determines a driving state of the induction heating apparatus.

In one embodiment, the controller determines that the driving state of the induction heating apparatus is normal when the rising edge timing of the phase margin pulse is earlier than the center point timing of the first switching signal, and determines that the driving state of the induction heating apparatus is abnormal when the rising edge timing of the phase margin pulse is later than the center point timing of the first switching signal.

In one embodiment, the controller determines a driving state of the induction heating apparatus based on a voltage level of the phase margin pulse, on a rising edge timing of the first switching signal.

In one embodiment, the controller determines that the driving state of the induction heating apparatus is normal when the voltage level of the phase margin pulse is high level on the rising edge timing of the first switching signal, and determines that the driving state of the induction heating apparatus is abnormal when the voltage level of the phase margin pulse is low level on the rising edge timing of the first switching signal.

In one embodiment, having determined that the driving state of the induction heating apparatus is normal, the controller maintains the working coil operating, and having determined that the driving state of the induction heating apparatus is abnormal, stops the working coil from operating.

In one embodiment, the controller determines a re-driving frequency of the working coil, corresponding to the power level, after stopping the driving of the working coil, and drives the working coil at the re-driving frequency.

A method for controlling an induction heating apparatus of one embodiment includes receiving a power level input for a heating zone, determining a driving frequency of a working coil corresponding to the power level, driving the working coil at the driving frequency, measuring resonance current of the working coil, measuring driving voltage of a switching element included in an inverter circuit that supplies current to the working coil, generating a phase margin pulse based on the resonance current and the driving voltage, comparing the phase margin pulse with the switching signal and determining a driving state of the induction heating apparatus, and controlling the driving of the working coil based on the driving state of the induction heating apparatus.

In one embodiment, a voltage level of the phase margin pulse is high level in a section in which the resonance current is a negative number and driving voltage of a second switching element is at a high level, and is low level in the remaining section.

In one embodiment, comparing the phase margin pulse with the switching signal and determining a driving state of the induction heating apparatus includes determining that a driving state of the induction heating apparatus by comparing the rising edge timing of the phase margin pulse with the center point timing of the first switching signal.

In one embodiment, comparing the phase margin pulse with the switching signal and determining a driving state of the induction heating apparatus includes determining that the driving state of the induction heating apparatus is normal when the rising edge timing of the phase margin pulse is earlier than the center point timing of the first switching signal, and determining that the driving state of the induction heating apparatus is abnormal when the rising edge timing of the phase margin pulse is later than the center point timing of the first switching signal.

In one embodiment, comparing the phase margin pulse with the switching signal and determining a driving state of the induction heating apparatus includes determining a driving state of the induction heating apparatus based on a voltage level of the phase margin pulse, on a rising edge timing of the first switching signal.

In one embodiment, comparing the phase margin pulse with the switching signal and determining a driving state of the induction heating apparatus includes determining that the driving state of the induction heating apparatus is normal when the voltage level of the phase margin pulse is high level on the rising edge timing of the first switching signal, and determining that the driving state of the induction heating apparatus is abnormal when the voltage level of the phase margin pulse is low level on the rising edge timing of the first switching signal.

In one embodiment, controlling the driving of the working coil includes maintaining the working coil operating when the driving state of the induction heating apparatus is normal, and stopping the working coil from operating when the driving state of the induction heating apparatus is abnormal.

In one embodiment, controlling the driving of the working coil further includes determining a re-driving frequency of the working coil, corresponding to the power level, after the driving of the working coil stops, and driving the working coil at the re-driving frequency.

In the embodiments of the disclosure, it can be accurately determined which one of the capacitive area and the inductive area includes a driving frequency of a working coil when an induction heating apparatus operates.

In the embodiments of the disclosure, when it is determined that the driving frequency of the working coil is included in the capacitive area, the induction heating apparatus stops operating or the driving frequency of the working coil is set again. Thus, during the driving of the induction heating apparatus, the power efficiency of the working coil can improve, and switching elements can be prevented from being burned.

The embodiments are described above with reference to a number of illustrative embodiments thereof. However, embodiments are not limited to the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An induction heating apparatus, comprising:
   a working coil disposed to correspond to a heating area;
   an inverter that includes a first switching element and a second switching element, and configured to provide current to the working coil;
   a driving circuit configured to provide a first switching signal to the first switching element and to provide a second switching signal to the second switching element; and
   a controller configured to determine a driving frequency of the working coil corresponding to a power level of the heating area, when the power level is input, to provide a control signal, to the driving circuit, based on the driving frequency, and to drive the working coil,
   wherein the controller is configured to:
      determine resonance current of the working coil,
      determine driving voltages of the first switching element and the second switching element that provides current to the working coil,
      provide a phase margin pulse based on the determined resonance current and the determined driving voltages,
      make a comparison of the phase margin pulse with the first switching signal and determine a driving state of the induction heating apparatus based on the comparison, and
      control the driving of the working coil based on the determined driving state of the induction heating apparatus, and
   wherein the controller is configured to determine the driving state of the induction heating apparatus based on a voltage level of the phase margin pulse, during a rising edge timing of the first switching signal.

2. The induction heating apparatus of claim 1, wherein a voltage level of the phase margin pulse is a high level during a time period in which the resonance current is a negative number and the driving voltage of the second switching element is at a high level, and the voltage level of the phase margin pulse is a low level during remaining time periods.

3. The induction heating apparatus of claim 1, wherein the controller is configured to compare a rising edge timing of the phase margin pulse with a center point timing of the first switching signal and determine the driving state of the induction heating apparatus based on the comparison.

4. The induction heating apparatus of claim 3, wherein the controller is configured to determine that the driving state of the induction heating apparatus is normal when the rising edge timing of the phase margin pulse is earlier than the center point timing of the first switching signal, and
   the controller is configured to determine that the driving state of the induction heating apparatus is abnormal when the rising edge timing of the phase margin pulse is later than the center point timing of the first switching signal.

5. The induction heating apparatus of claim 1, wherein the controller is configured to determine that the driving state of the induction heating apparatus is normal when the voltage level of the phase margin pulse is a high level during the rising edge timing of the first switching signal, and
   the controller is configured to determine that the driving state of the induction heating apparatus is abnormal when the voltage level of the phase margin pulse is a low level during the rising edge timing of the first switching signal.

6. The induction heating apparatus of claim 1, wherein when the driving state of the induction heating apparatus is determined to be normal, the controller maintains operating of the working coil, and
   when the driving state of the induction heating apparatus is determined to be abnormal, the controller stops operating of the working coil.

7. The induction heating apparatus of claim 6, wherein after stopping operating of the working coil, the controller determines a re-driving frequency of the working coil, corresponding to the power level, and drives the working coil based on the re-driving frequency.

8. A method for controlling an induction heating apparatus that includes an inverter and a working coil, comprising:
   receiving a power level for a heating area;
   determining a driving frequency of the working coil, corresponding to the received power level;
   driving the working coil at the determined driving frequency;

determining resonance current of the working coil;
determining driving voltages of a first switching element and a second switching element of the inverter that provides current to the working coil;
providing a phase margin pulse based on the determined resonance current and the determined driving voltages;
determining a driving state of the induction heating apparatus by making a comparison of the phase margin pulse and a first switching signal provided to the first switching element; and
controlling the driving of the working coil based on the determined driving state of the induction heating apparatus,
wherein the determining of the driving state comprises determining the driving state of the induction heating apparatus based on a voltage level of the phase margin pulse, during a rising edge timing of the first switching signal.

9. The method of claim 8, wherein a voltage level of the phase margin pulse is a high level during a time period in which the resonance current is a negative number and the driving voltage of the second switching element is at a high level, and the voltage level of the phase margin pulse is a low level during remaining time periods.

10. The method of claim 8, wherein the determining of the driving state comprises comparing a rising edge timing of the phase margin pulse with a center point timing of the first switching signal and determining the driving state of the induction heating apparatus based on the comparison.

11. The method of claim 10, wherein the determining of the driving state comprises:
determining that the driving state of the induction heating apparatus is normal when the rising edge timing of the phase margin pulse is earlier than the center point timing of the first switching signal; and
determining that the driving state of the induction heating apparatus is abnormal when the rising edge timing of the phase margin pulse is later than the center point timing of the first switching signal.

12. The method of claim 8, wherein the determining of the driving state comprises:
determining that the driving state of the induction heating apparatus is normal when the voltage level of the phase margin pulse is a high level during the rising edge timing of the first switching signal; and
determining that the driving state of the induction heating apparatus is abnormal when the voltage level of the phase margin pulse is a low level during the rising edge timing of the first switching signal.

13. The method of claim 8, wherein the controlling of the driving of the working coil comprises:
maintaining operation of the working coil when the driving state of the induction heating apparatus is determined to be normal; and
stopping operation of the working coil when the driving state of the induction heating apparatus is determined to be abnormal.

14. The method of claim 13, wherein the controlling of the driving of the working coil comprises:
after stopping operation of the working coil, determining a re-driving frequency of the working coil, corresponding to the power level; and
driving the working coil based the re-driving frequency.

15. An induction heating apparatus, comprising:
a working coil disposed to correspond to a heating area;
an inverter that includes a first switching element and a second switching element, and configured to provide current to the working coil; and
a controller configured to:
determine resonance current based on the working coil,
determine driving voltages of the first switching element and the second switching element that provides current to the working coil,
provide a phase margin pulse based on the determined resonance current and the determined driving voltages,
determine a driving state of the induction heating apparatus based at least on the phase margin pulse, and
control driving of the working coil based on the determined driving state,
wherein the controller is configured to determine the driving state of the induction heating apparatus based on a voltage level of the phase margin pulse and a rising edge timing of a first switching signal provided to the first switching element.

16. The induction heating apparatus of claim 15, wherein the controller is configured to determine the driving state of the induction heating apparatus based on a rising edge timing of the phase margin pulse and a center point timing of the first switching signal.

17. The induction heating apparatus of claim 16, wherein the controller is configured to determine that the driving state of the induction heating apparatus is normal when the rising edge timing of the phase margin pulse is earlier than the center point timing of the first switching signal, and
the controller is configured to determine that the driving state of the induction heating apparatus is abnormal when the rising edge timing of the phase margin pulse is later than the center point timing of the first switching signal.

* * * * *